United States Patent Office 3,489,182
Patented Jan. 13, 1970

3,489,182
LIQUID CONVEYING HOSE WITH FLOAT
Ian D. K. Cameron, Edinburgh, Scotland, assignor to Uniroyal Limited, Edinburgh, Scotland, a corporation of Scotland
Filed Mar. 23, 1967, Ser. No. 625,386
Int. Cl. F16l 3/00, 55/00
U.S. Cl. 138—103      2 Claims

ABSTRACT OF THE DISCLOSURE

An annular float of a closed cell, expanded synthetic plastics material has a cut extending therethrough from one side wall to the other to permit the float to be opened out and fitted around the outside of a liquid-conveying hose, and a method of fitting the annular float to a hose.

BACKGROUND OF THE INVENTION

Field of the invention

This invention relates to floats for fitting around the outside of a liquid-conveying hose, to a method of fitting floats to such hoses and to the hoses when fitted with such floats.

Description of the prior art

At the present time, hoses which are capable of floating on the sea are being used for unloading or loading oil or other liquids from a tanker to a shore installation or vice versa. The necessary buoyancy is obtained by placing a number of floats around the hose, the floats being formed of a synethetic expanded resin and being of annular configuration.

The ends of each hose section are provided with fittings which are usually built-in during the construction of the hose and include nipples and connecting flanges for joining adjacent sections of hose together. Thus, in the past the internal diameter of the annular floats has been sufficiently large to enable them to pass over the flanges, resulting in an extremely loose fit on the hose and, when in use, an abrading action took place. Furthermore, it was almost impossible to have a close-fitting float on the hose even if the end fittings of the hose were mounted after vulcanization and completion of the hose.

SUMMARY OF THE INVENTION

The present invention provides a float that can be applied to a hose so that it has as close a fit as required. This is accomplished by providing an annular float having an internal diameter coinciding with the external diameter of the hose to which the float is to be attached. The float may have a slight clearance, if desired. A cut is then made through the float from one side wall to the other and the float is opened out and positioned around the hose. An adhesive may be applied to the cut faces to provide a firm bond. An improved liquid-conveying hose may be made by providing the hose with a number of floats having a predetermined close fit.

DESCRIPTION OF THE PREFERRED EMBODIMENTS

Figure 1:
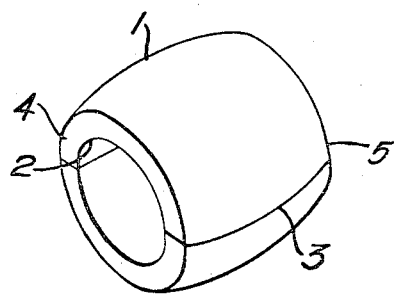
FIGURE 1 is a perspective view of a first embodiment of a float.

FIGURE 1 shows a float having a substantially barrel-shaped outer surface 1, and an inner surface 2 of a circular cross-section. A cut 3 is made radially through the material of the float and extends parallel to the axis of the float from one side wall 4 to the other side wall 5.

To fit the float shown in this figure to a hose, the float is first trimmed so that it will be either a close fit round the hose or will have a predetermined narrow clearance on the hose. To achieve this circumferential portion of the float may have to be removed, the size of which can be calculated by subtracting the outside diameter of the hose, or this outside diameter plus the clearance if required, from the inside diameter of the float and multiplying the difference by 3.14. The mating of the two cut surfaces of the float is now checked and the surfaces are trimmed to ensure that they will fit closely one against the other. The portion of the float diametrically opposite to the cut is then warmed, and when this portion has softened slightly the float is opened out and fitted around the hose. Water is then applied to the adjacent cut surfaces, and a urethane adhesive, such as Adiprene L167 is applied thereto, further water then being applied over the adhesive. The cut surfaces of the float are now pulled tightly together using metal bands applied by a machine, a further quantity of water is poured over the joint to provide a cross-linking agent for the urethane adhesive, and the adhesive is allowed to set for 48 hours at room temperature. Any excess adhesive is now removed from around the joint and any remaining small spaces are filled, preferably with a two-part epoxy based adhesive filler. This filler is allowed to harden for 24 hours and the joint is then buffed smooth, one coat of paint, such as Vulcaprene then being applied over the joint, and over the entire accessible surface of the float.

The method set out in the preceding paragraph is that used when the float is to have a predetermined narrow clearance around the hose, but when the float is to have a close fit around the hose it is usual to adhere the float to the hose, and the following additional steps need to be carried out before the float is fitted around the outside of the hose. Firstly, that part of the surface of the hose which will be covered by the float is soaked with water, and an adhesive, such as Adiprene L167 is applied over the soaked area of the hose, water then being applied over the adhesive. The float can then be placed around the hose in contact with the adhesive and the application of the metal bands, as well as pulling the cut surfaces of the float together, will also pull the internal diameter of the float tightly into contact with the layer of adhesive around the hose, which adhesive will then cure to bond the float to the hose.

Figure 2:
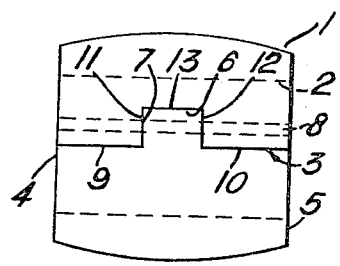
FIGURE 2 is a side elevation of a second embodiment of a float.

The float shown in FIGURE 2 of the drawing is similar in overall shape to that shown in FIGURE 1, but in this case the cut is made so that it defines an inter-engaging tongue 6 and groove 7 on the parts lying on opposite sides of the cut. In addition an aperture 8 is formed through the float from one side wall 4 to the other side wall 5 and passes through the inter-engaging tongue and groove parts 6 and 7. The aperture 8 can thus receive a locking pin which will pass through the tongue and groove formation to hold the two cut faces of the float together. The type of float shown in FIGURE 2 is fitted to the hose in a similar manner to that described with reference to the float of FIGURE 1. The cut 3 is made by first sawing the parts 9 and 10 of the cut from the respective side walls 4 and 5, and then a warmed knife is used for making the cuts 11, 12 and 13. The temperature of the knife must be such that it is not so hot as to cause shrinkage of the material resulting in a poorly fitting join. After the cuts have been made a circumferential portion of the float may be removed as already described so that the internal diameter of the float bears the required relation to the external diameter of the hose. The cut removing such portion is of course made parallel at all parts to the cut 3.

The two cut surfaces are then closed together so that the tongue engages in the groove, and the aperture 8 is formed by drilling using a short piece of heated mandrel. For floats that are already known to be the correct size the aperture 8 may be drilled before the cut 3 is made.

Water and adhesive are now applied to the cut faces of the float as previously described, and these faces are brought together under the action of metal bands applied round the float. When the tongue and groove interconnect properly a locking pin coated with adhesive is passed through the aperture 8 to lock the tongue and groove together. The locking pin may be of the same synthetic plastics material as the remainder of the float, or it may be glass fibre, wood or any suitable material that will be resistant to sea water. Setting of the adhesive, filling and buffing the joint and painting the float are then all carried out as previously described.

The float shown in FIGURE 2 was assumed to be manufactured in the correct size to have the required fit on the desired hose. If the starting float is oversize, that is of too large internal diameter, then a further cut must be made identical to the cut 3 and spaced therefrom, the spare material so removed being discarded. The amount of material to be cut out may be calculated as described in relation to the embodiment of FIGURE 1. If the starting float is undersize, that is if too small internal diameter, then a spacer, conforming in shape to the cut-out part from an oversize mould, is used between the two cut surfaces, and two locking pins will be needed extending parallel to each other and each locking one cut face of the float to a face on the spacer.

The preferred material for the floats described is a synthetic expanded resin of the polyvinyl type, since this has low water absorption and good weathering properties. A further material that can be used is expanded Adiprene.

Figure 3:
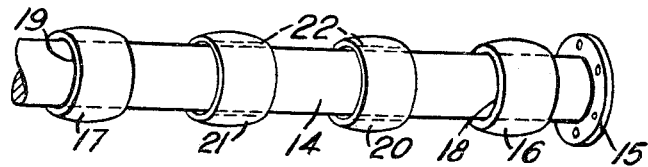
FIGURE 3 is a perspective view of a length of hose with floats fitted thereon.

FIGURE 3 shows a length of hose 14 with a connecting flange 15 at one end thereof and having a series of floats according to the invention fitted thereto. The floats 16 and 17 are designed to have a tight fit around the hose and a layer of adhesive 18 and 19 respectively is present between the hose and the float to bond the float to the hose. The floats 20 and 21 have a predetermined narrow clearance 22 between their internal diameter and the external diameter of the hose. This arrangement with some of the floats bonded to the hose and some having a clearance around the hose avoids imparing the flexibility of the hose, which would occur if all the floats were bonded thereto, and were in close contact with each other. It also prevents all the floats moving to one end of the hose which would occur if all the floats were provided with a clearance. The sequence of floats bonded to the hose, and those with the clearance round the hose can be as required, although it has been found preferable to have every third float bonded to the hose as shown in FIGURE 3.

Having thus described my invention, what I claim and desire to protect by Letters Patent is:

1. A liquid conveying hose having fitted thereon at least one closed cell expanded plastic annular float body having a cut radically through said float body extending from one side of the float body to the other defining interengaging parts to permit the float body to be opened and fitted around the outside of the hose, and an internal locking means within the float body for sealing together said intergaging parts consisting of an aperture in the float body which extends from one side to the other of the float body through said interengaging parts and a locking pin mounted into said aperture for locking the float around the hose, the cut surfaces and the internal locking means being bonded together by an adhesive.

2. A liquid conveying hose according to claim 1 in which at least one float has a tight fit around the hose and is bonded to the hose by an adhesive.

References Cited

UNITED STATES PATENTS

| | | | |
|---|---|---|---|
| 2,383,840 | 8/1945 | Benckert | 9—8 X |
| 2,395,892 | 3/1946 | Lontz | 9—8 |
| 2,419,053 | 4/1947 | Bennett. | |
| 2,461,833 | 2/1949 | Mercier | 43—43.1 X |
| 2,897,625 | 8/1959 | Spitzli et al. | 43—43.1 |
| 3,332,093 | 7/1967 | Skinner et al. | 9—8 |
| 1,127,423 | 2/1915 | Faus | 59—89 |
| 1,597,259 | 8/1926 | Wilson | 59—89 |
| 3,307,208 | 3/1967 | Jacobson | 9—8 X |

LOUIS K. RIMRODT, Primary Examiner

U.S. Cl. X.R.

9—8

PO-1050
(5/69)

UNITED STATES PATENT OFFICE
CERTIFICATE OF CORRECTION

Patent No. 3,489,182   Dated January 13, 1970

Inventor(s) Ian D. K. Cameron

It is certified that error appears in the above-identified patent and that said Letters Patent are hereby corrected as shown below:

Column 4, line 20, "intergaging" should read --interengaging--.

SIGNED AND
SEALED
AUG 18 1970

(SEAL)
Attest:

Edward M. Fletcher, Jr.
Attesting Officer

WILLIAM E. SCHUYLER, JR.
Commissioner of Patents